INVENTOR.
EDWIN L. ALLEN

Sept. 1, 1953  E. L. ALLEN  2,650,846
DOOR CONTROL MECHANISM
Filed Oct. 20, 1949  9 Sheets-Sheet 4
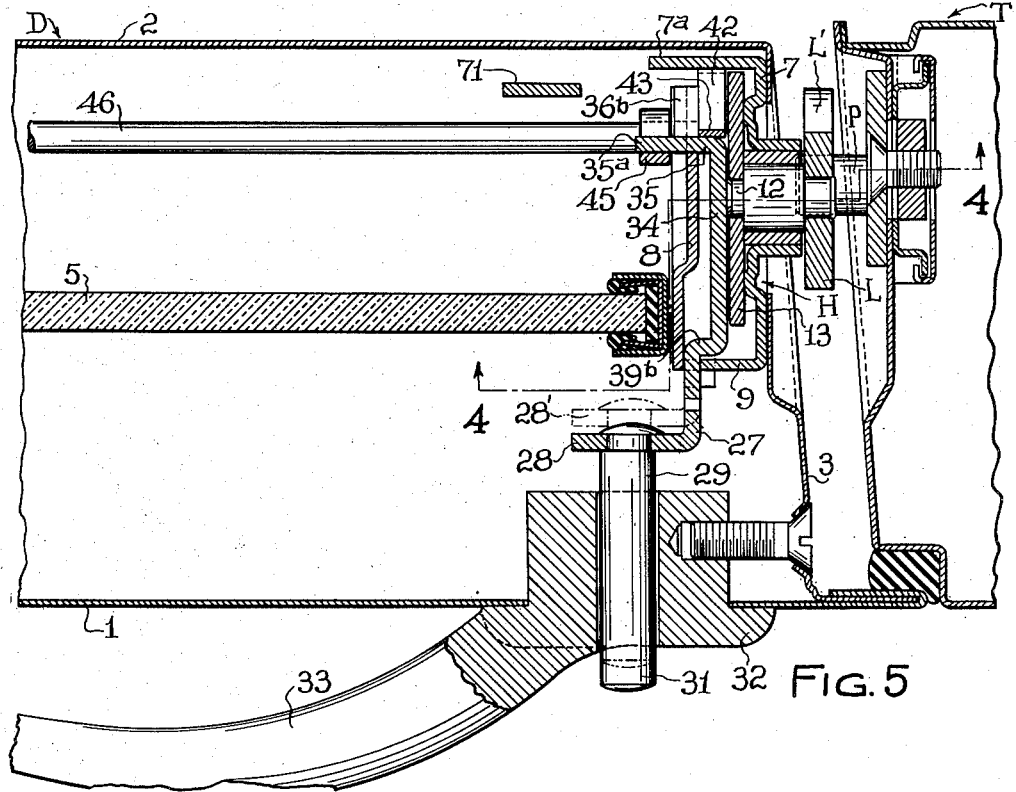
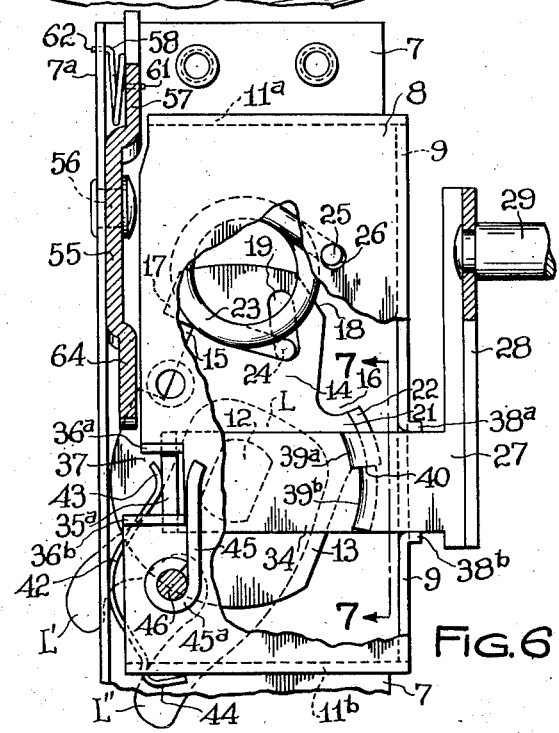
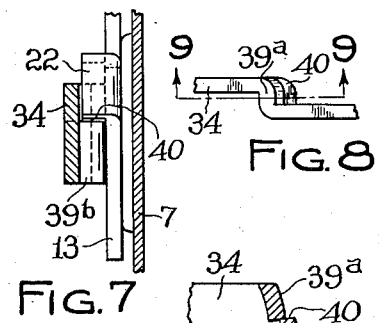
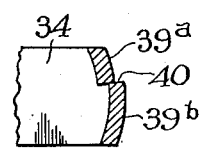
INVENTOR.
EDWIN L. ALLEN
BY
Bosworth & Sessions
ATTORNEYS.

Sept. 1, 1953  E. L. ALLEN  2,650,846
DOOR CONTROL MECHANISM
Filed Oct. 20, 1949  9 Sheets-Sheet 5

INVENTOR.
EDWIN L. ALLEN
BY Bosworth & Sessions
ATTORNEYS

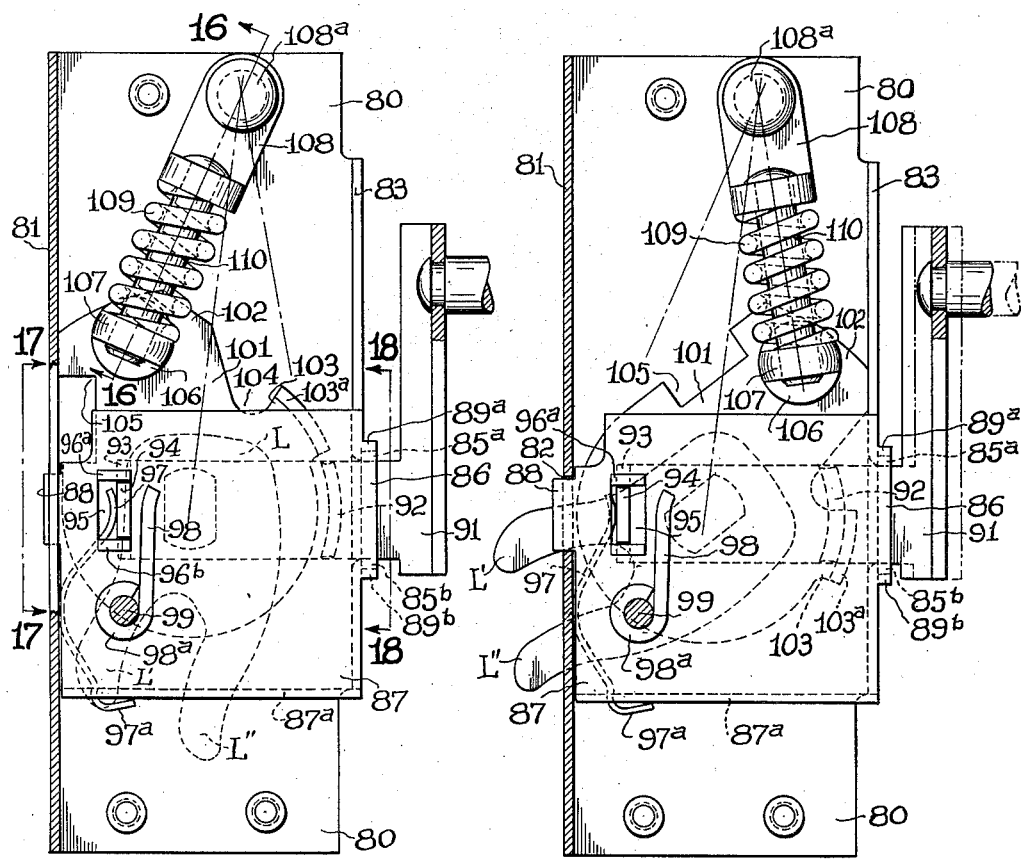
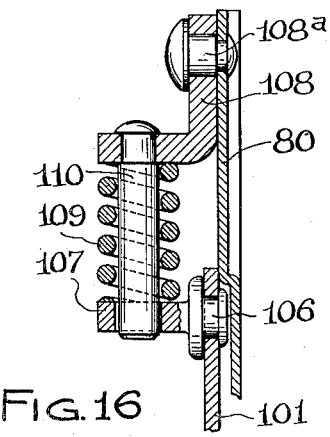
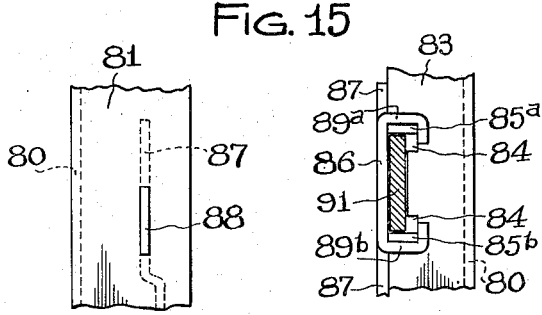

INVENTOR.
EDWIN L. ALLEN
BY
ATTORNEYS

Sept. 1, 1953     E. L. ALLEN     2,650,846
DOOR CONTROL MECHANISM
Filed Oct. 20, 1949     9 Sheets-Sheet 8
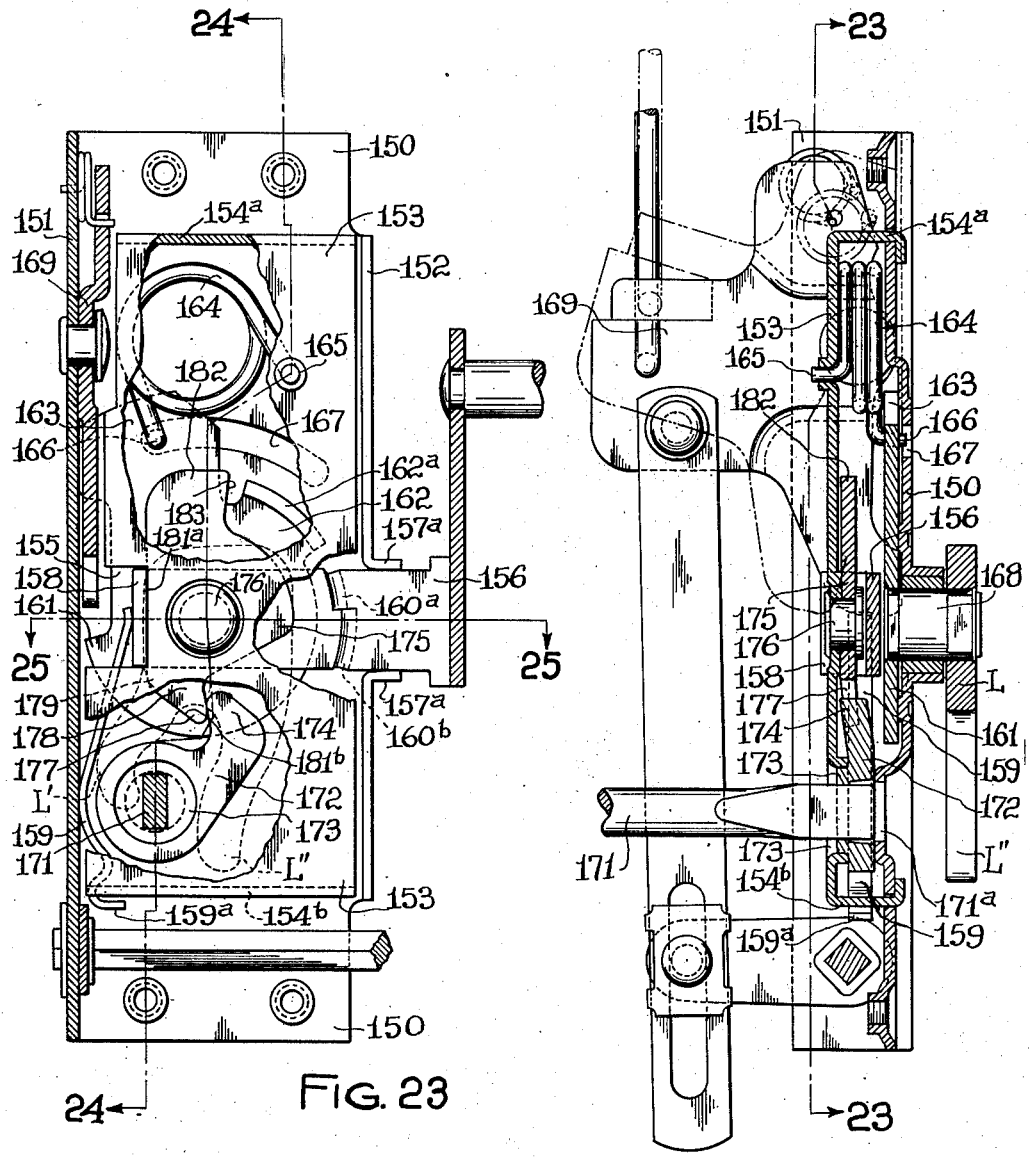
FIG. 23
FIG. 24
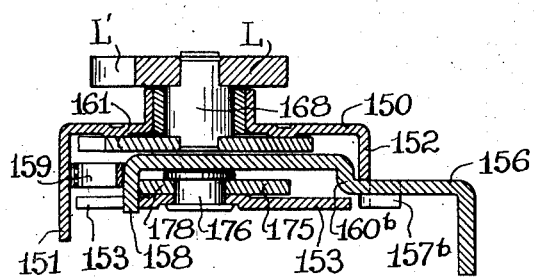
FIG. 25
INVENTOR.
EDWIN L. ALLEN
BY
ATTORNEYS

INVENTOR.
EDWIN L. ALLEN

Patented Sept. 1, 1953

2,650,846

UNITED STATES PATENT OFFICE 2,650,846

DOOR CONTROL MECHANISM

Edwin L. Allen, Cleveland Heights, Ohio, assignor, by mesne assignments, to Rudolph I. Schonitzer, Cleveland, Ohio Application October 20, 1949, Serial No. 122,436

11 Claims. (Cl. 292—216)

This invention relates to door control mechanisms and, more particularly, to mechanisms for latching and unlatching a vehicle door and, where it is desirable to include the same, also to means for locking and unlocking the latch mechanism.

The invention relates broadly to a door control apparatus which may be described as having coacting elements associated with door and door frame structures whereby the door may be latched and held in closed position or unlatched and released to permit it to be moved into open position. In general, a push button, a plunger, a handle or the like is employed through which may be exerted part or all of the force expended in moving the door from door-latched to door-unlatched position; indeed, the invention in one of its aspects contemplates the provision of a latch structure by which actuation of the latch mechanism incident to opening the door may be initiated by operation of a push button or the like but further force must be applied to complete the operation of unlatching and opening the door.

One of the principal objects of the invention is the provision of a compact, rugged and inexpensive latch mechanism particularly adapted for use with automobile doors. Other objects include the provision of an improved control mechanism by which actuation of what is hereinafter referred to as the latch member may be impeded or permitted; the provision of improved spring means which, in moving from one to the other of two terminal positions, during part of its travel exerts a force urging the parts into door-latched relation and during another part of its travel urges them into door-unlatched relation; and, the provision of effective means for restraining or permitting movement of the latch member together with means, operable from either the interior or the exterior of the vehicle, for moving the latch-restraining member into latch-locked or latch-unlocked position, as may be desired.

Other objects and advantages of the invention will appear from the written description which follows, taken with the accompanying drawings in which:

Figure 5 is a horizontal cross-sectional view taken substantially along line 5—5 of Figures 2, 3 and 4;

Figure 6 is a detached view of the mechanism of Figure 3, the door structure being omitted however and the latch member being shown in its intermediate or secondary latched position;

Figure 7 is a fragmentary view showing the latch plate and control slide member and taken substantially on line 7—7 of Figure 6;

Figure 8 is a fragmentary view of the control slide member as seen from line 8—8 of Figure 3;

Figure 9 is a cross-sectional view of the control slide member taken substantially on line 9—9 of Figure 8;

Figures 14 and 15 are views generally similar to Figure 6 but illustrating a modification employing a compression spring, Figure 14 showing the latch member in latched position and Figure 15 showing it in unlatched position;

Figure 16 is a detail, largely in section, of the spring assembly of Figures 14 and 15 as seen from line 16—16 of Figure 14;

Figure 3:
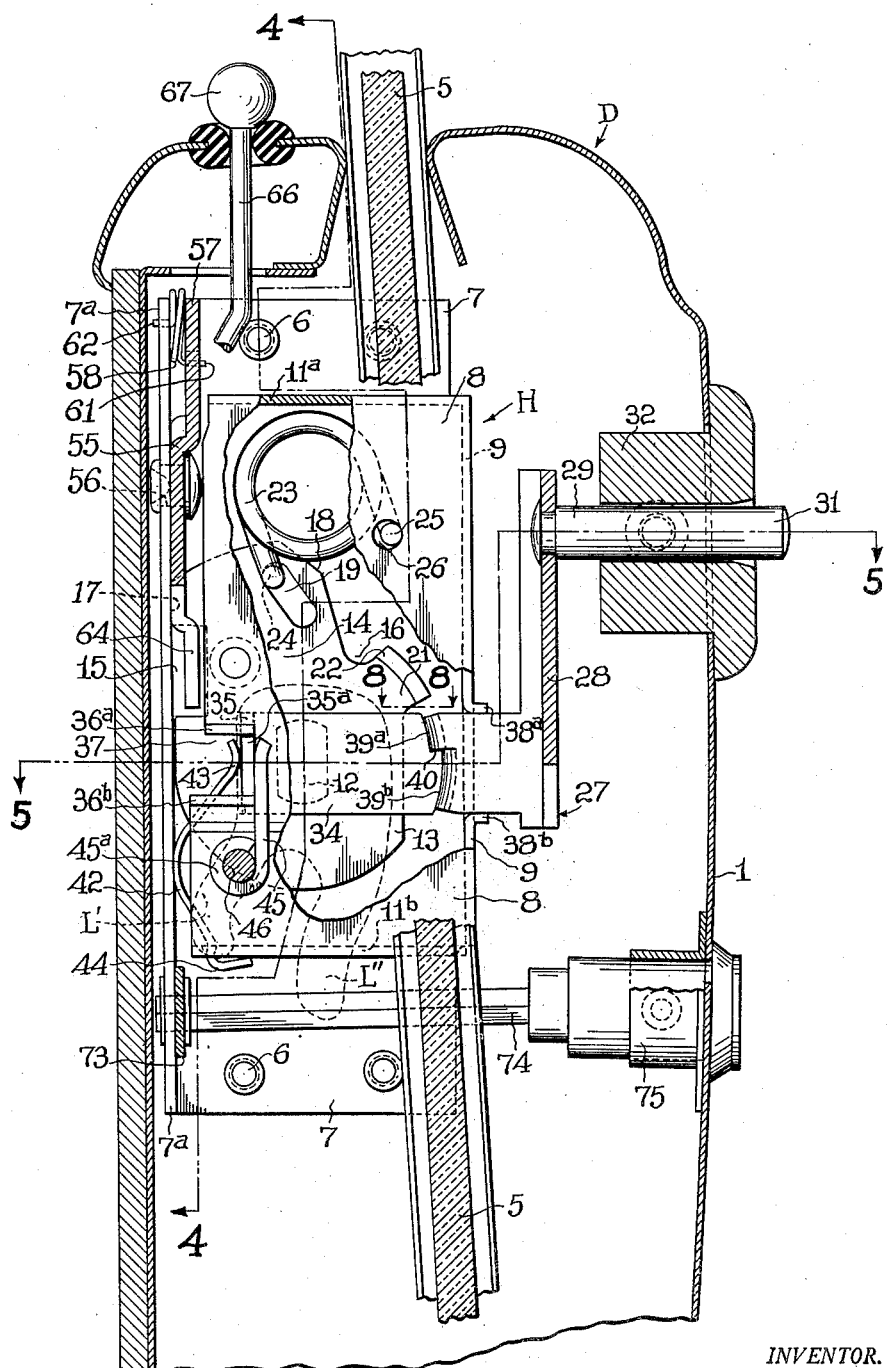
Figure 3 is an enlarged vertical cross-sectional view, with parts broken away, taken substantially on line 3—3 of Figure 1.
Figures 19, 20:
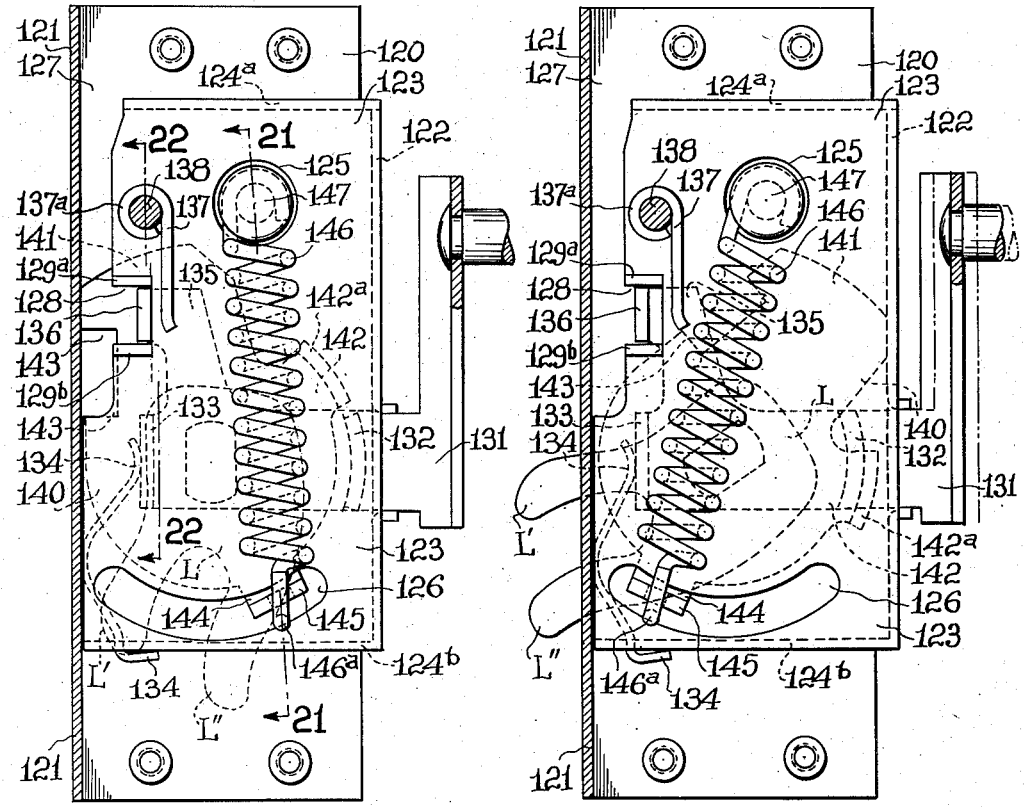
Figure 21:
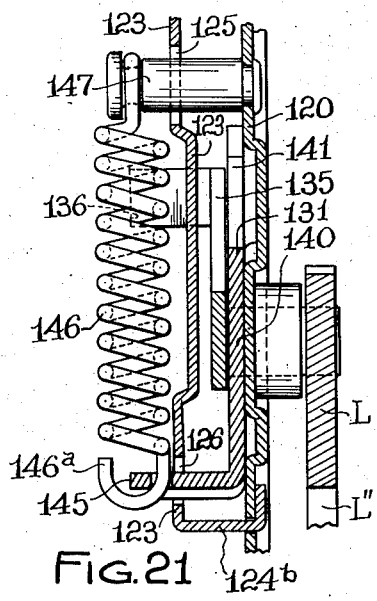
Figure 22:
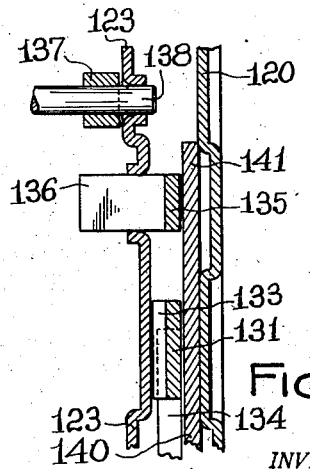
Figure 26:
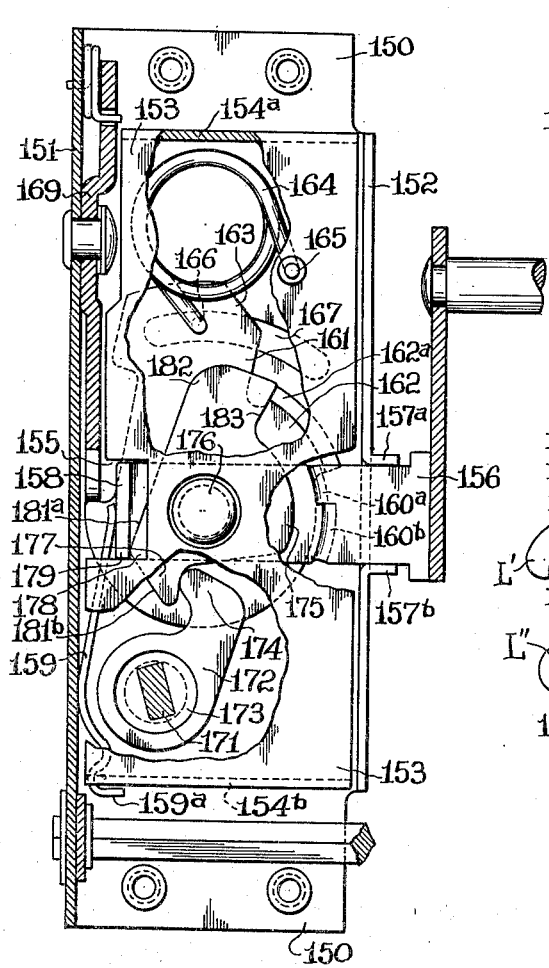
Figure 27:
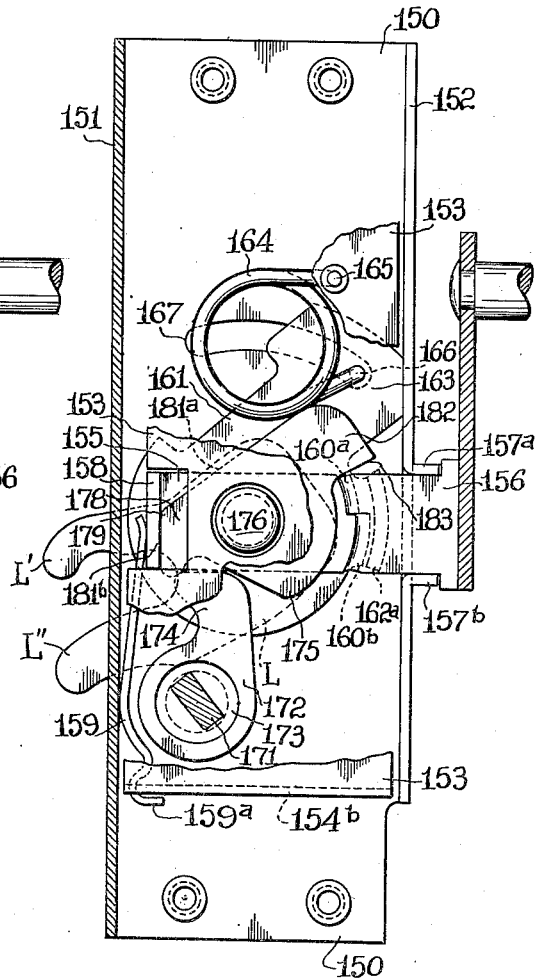

Figures 17 and 18 are details showing the manner of mounting the cover plate on the base plate and guiding the control member, as seen from lines 17—17 and 18—18, respectively, of Figure 14;

Figures 19 and 20 are views corresponding generally to Figures 14 and 15 respectively but illustrating a further modification employing a tension spring rather than a compression spring;

Figure 21 is a detail, largely in section, of the spring assembly of Figures 19 and 20 as seen from line 21—21 of Figure 19;

Figure 22 is a detail, largely in section, of the interior mechanism as seen from line 22—22 of Figure 19;

Figure 23 is a view corresponding generally to Figure 3 but showing still another modification;

Figure 24 is a vertical cross-sectional view taken substantially on line 24—24 of Figure 23;

Figure 25 is a horizontal cross-sectional view taken substantially on line 25—25 of Figure 23; and Figures 26 and 27 are views of the mechanism of Figure 23 and generally similar thereto but respectively showing the parts in secondary latched and door-unlatched positions.

Referring first to Figures 1 to 5, inclusive, door D includes, along with the various other conventional elements which go to make up the door of a vehicle, such parts as outer panel 1, inner panel 2, and edge wall 3. The latter conceals the interior construction of lock pillar 4. On edge wall 3 and within lock pillar 4 is mounted a door latch housing H. Positioned inwardly of housing H for movement between the usual raised and lowered positions in door D is a window glass shown in raised position in solid lines 5 and in lowered position in phantom lines 5'. Door D is mounted on and in a manner to permit it to close against body pillar T of the vehicle.

Figure 4:
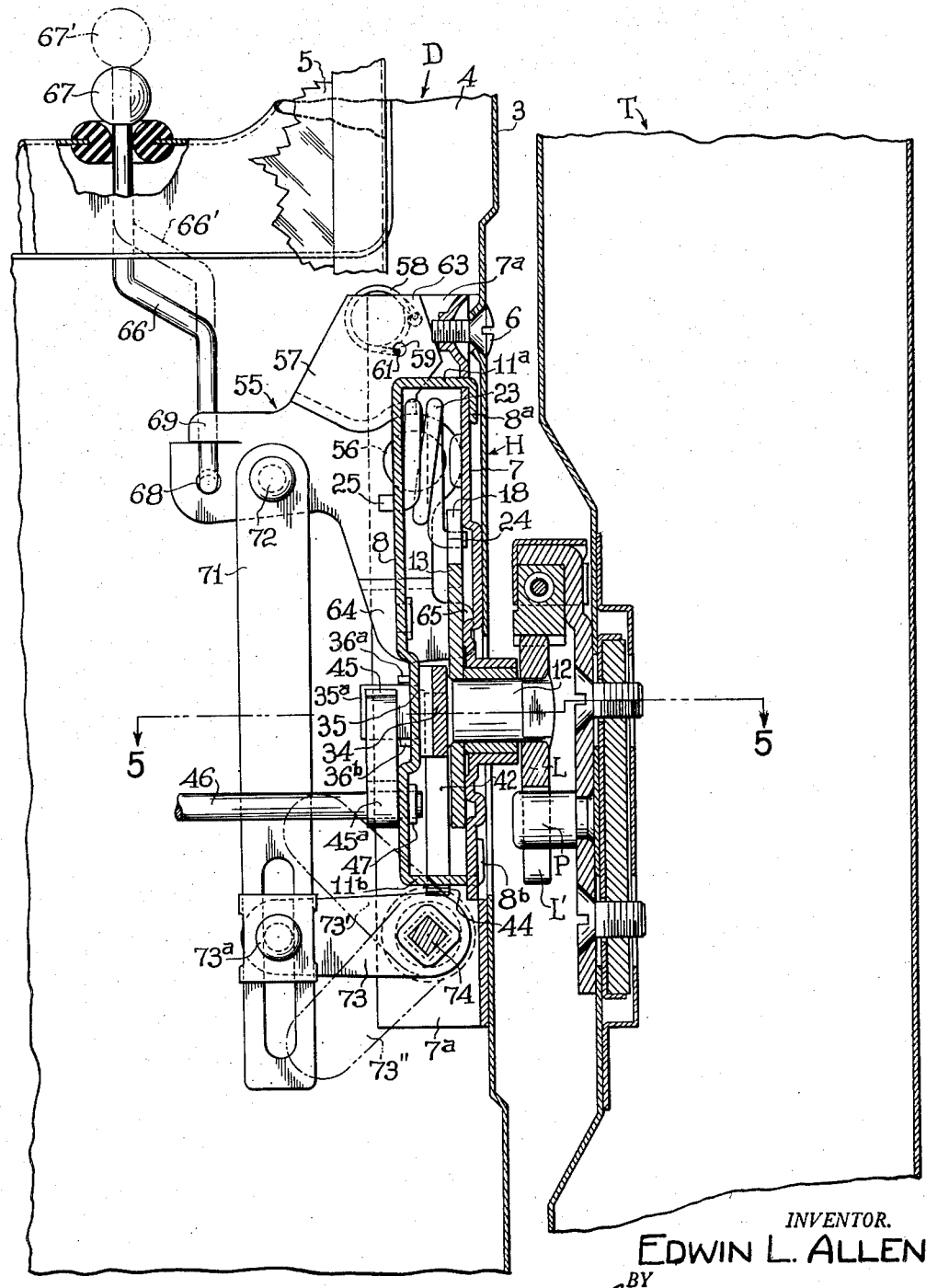
Figure 4 is a vertical cross-sectional view taken substantially along line 4—4 of Figures 2, 3 and 5.

Housing H, which is affixed to edge wall 3 by means of screws 6, embodies a base plate 7 which is mounted immediately within edge wall 3. As shown in Figures 4 and 5, base plate 7 has along one side thereof an inwardly directed edge flange 7a, such flange extending the full length of base plate 7 along the side thereof in juxtaposition to inner panel 2. Cooperating with base plate 7 but spaced from flange 7a thereof is a cover plate 8, one side of which abuts and is closed by an inwardly directed edge wall 9 which is integral with base plate 7 but which is coextensive with cover 8 on the side thereof in proximity to outer panel 1. Cover plate 8 is provided with two integrally formed end walls 11a and 11b which respectively define the upper and lower limits of the cover plate and on which are formed two oppositely directed portions 8a and 8b that, as illustrated in Figure 4, project through and are bent over into firm contact with base plate 7.

These various elements, which collectively make up housing H, form part of the frame structure supporting a latch mechanism hereinafter to be described incorporating an externally positioned latch member L characterized by legs L' and L'', of which the former, which adjoins inner panel 2, is somewhat shorter than the latter. Latch member L cooperates with a stationary keeper pin P mounted as shown in Figures 4 and 5 on body pillar T. Associated with pin P are the usual elements for adjusting and supporting it and for preventing rattling of latch member L. These elements are not described in detail as they are not a part of the present invention.

Latch member L is carried upon a squared-off shaft 12 supported for rotation in base plate 7 as best shown in Figure 5. On the opposite side of base plate 7, shaft 12 carries a latch plate or element 13 which, like latch member L, is rigidly fixed to shaft 12. Thus shaft 12, latch plate 13 and latch member L rotate as a unit, such rotation being limited in extent and characterized at its extremes by the door-latch and the door-unlatched positions respectively shown in Figures 3 and 10. Between them is an intermediate or secondary latched position in which the parts assume the relationship indicated in Figure 6.

Figure 10:
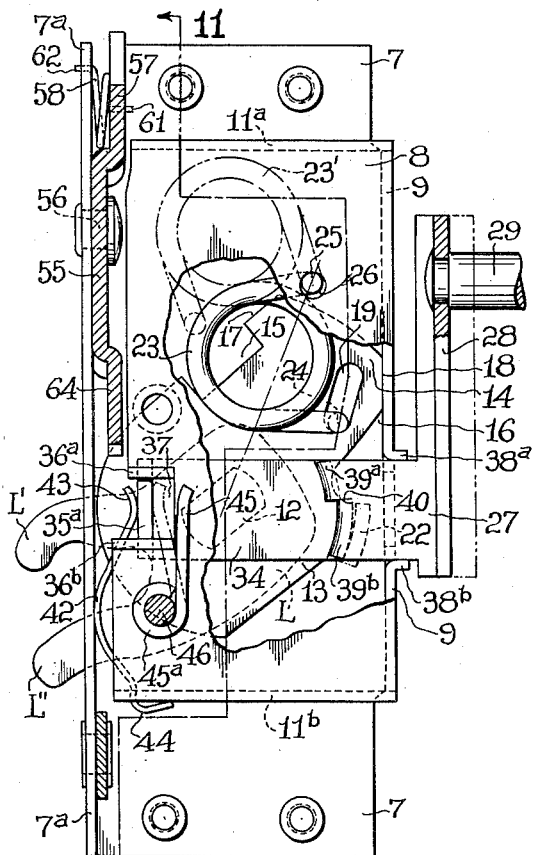
Figure 10 is a view generally similar to Figure 6 but showing the latch member in door-unlatched position and taken substantially on line 10—10 of Figure 11.

As shown in Figures 3, 6, and 10, latch plate 13 has a generally rounded lower portion and an irregularly shaped upper portion. Proceeding clockwise thereof with the parts of the latch in the relationship illustrated in Figure 3, the upper portion of latch plate 13 is characterized by a rectangular notch 15 at the left-hand side of the upper portion, by a V-notch 16 toward the right center thereof, and by a downwardly extending lateral notch located diametrically opposite the rectangular notch. Between the notch portions, proceeding clockwise, are an abutment portion 14 and a latch stop portion 21. The abutment portion 14 is formed between rectangular notch 15 and V-notch 16 and is characterized by a flat face 17 which, in the door-latched position illustrated in Figure 3, engages flange 7a of base plate 7; on the opposite side of abutment portion 14 is a like flat face 18 which, in the door-unlatched position illustrated in Figure 10, abuts edge wall 9 on base plate 7. Toward the top of abutment portion 14 is an elongated spring-receiving slot 19.

Latch stop portion 21, which is defined on one side by V-notch 16 and on the other side by the lateral notch opposite rectangular notch 15, is characterized by an arcuate contour and by an edge flange 22, likewise arcuate in shape, which extends inwardly, i. e., away from base plate 7 and toward cover plate 8. Arcuate flange 22 constitutes a holding portion which cooperates with a control slide member to be described. Similarly, abutment portion 14 cooperates with a latch-restraining member to be described, this more particularly by virtue of the part thereof which immediately overlies rectangular notch 15, which part may be described as a restraining-member engaging element comprising part of a locking abutment portion which itself form part of latch plate 13.

Figure 11:
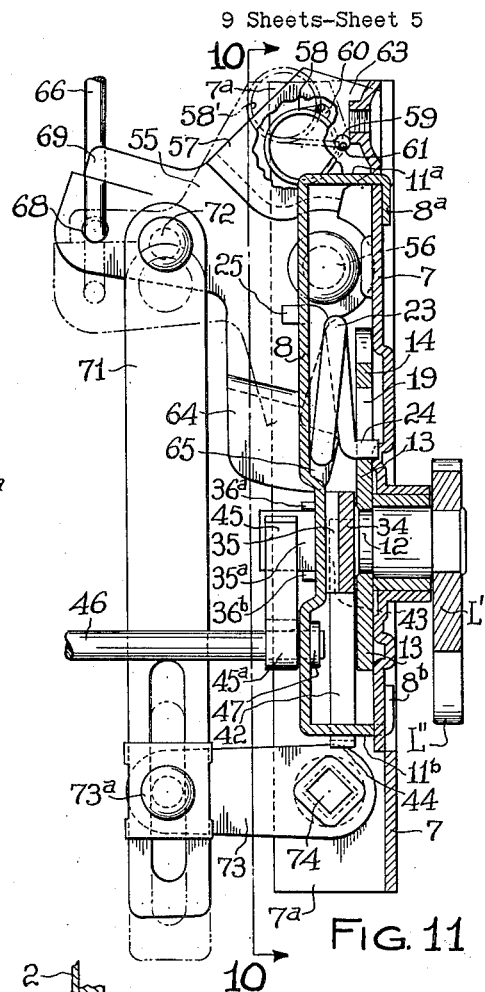
Figure 11 is a vertical cross-sectional view taken substantially on line 11—11 of Figure 10.

Cooperating with spring-receiving slot 19 in abutment portion 14 is a snap-over spring 23 which, in the embodiment of the invention illustrated in Figures 1 to 13, takes the form of a coil spring the ends of which tend to spread apart. Lower end 24 of snap-over spring 23 is received in and projects through slot 19 as shown in Figures 4 and 11. Upper end 25 of snap-over spring 23 is anchored in cover plate 8, projecting oppositely to lower end 24 through a suitable opening 26 in cover plate 8. Snap-over spring 23 has two terminal positions, shown in Figures 3 and 10 respectively, and between them goes through an infinite number of intermediate positions one of which is represented by the showing in Figure 6. Slot 19 extends at an acute angle to radii drawn from the center of shaft 12 to the ends of slot 19 and permits end 24 of spring 23 to move downwardly during movement of the latch member L from unlatched position to latched position thus avoiding excessive loading of the spring during such movement.

When latch plate 13 is in the position shown in Figure 3, that is to say in door-latched position, snap-over spring 23, acting on abutting portion 14 at the top part of spring-receiving slot 19, tends to urge latch plate 13 counterclockwise, thus maintaining abutting face 17 in contact with flange 7a of base plate 7. In door-unlatched position, illustrated in Figure 10, snap-over spring 23 acts on abutting portion 14 at the bottom part of spring-receiving slot 19, urging latch plate 13 clockwise so that abutting face 18 is in contact with edge wall 9 on base plate 7, as shown in Figure 10. Between these two positions; for example, in the secondary latched position of latch member L, snap-over spring 23 assumes an intermediate position such as that illustrated in Figure 6. In the course of its movement between its two terminal positions, i. e., between dotted line position 23' in Figure 10 and the solid line position immediately below it, snap-over spring 23 urges latch plate 13 and latch member L toward door-latched position during the initial part of its travel and toward door-unlatched position during the final part of its travel.

As is indicated in Figures 3, 5, 6 and 10, my invention contemplates the use of a selectively positioned control member 27 (hereinafter sometimes called the control slide member), which, in its normal position, precludes the possibility of substantial rotation of latch plate 13 out of the latched position of Figure 3. As seen in side elevation in Figures 3, 6 and 10, control slide member 27 is generally L-shaped, having an upwardly extending branch 28 and a laterally extending branch 34. Upwardly extending branch 28 has rigidly affixed thereto a rod 29 of which the outermost portion 31 serves as a manually operable push button or plunger accessible from the outside of the vehicle. Plunger 31 is surrounded by a guide 32 held in position in outer panel 1 which guide is formed integrally with a stationary handle 33 for use in opening and closing door D from the outside of the vehicle. When plunger 31 is moved inwardly from the position of Figure 3, upwardly extending branch 28 of control slide member 27 assumes the retracted dotted-line position 28' indicated in Figure 5. Other parts of control slide member 27 move linearly to assume correspondingly retracted positions.

As best shown in Figures 3, 4 and 11, the laterally extending branch 34 of control slide member 27 is provided at its end with an in-turned flange. The latter is itself provided with a centrally positioned inwardly projecting extension 35a which is somewhat narrower than flange 35. Extension 35a projects through and moves in a slot 37 in cover plate 8 formed between two integrally formed in-turned guide flanges 36a and 36b which appear in Figures 3, 4 and 11 and also in Figures 5, 6 and 10. Edge wall 9 of housing H is lanced or otherwise formed to provide a slot between lips 38a and 38b which serve as guides for lateral branch 34 of control slide member 27 where the latter enters housing H. Thus control slide member 27 is supported on one side by guide flanges 36a and 36b and on the other side by lips 38a and 38b. The horizontal dimension of slot 37 helps determine the extent of permissible lateral movement of control slide member 27 by limiting movement to the right as seen in Figures 3, 6 and 10, while lips 38a and 38b serve to limit movement of control slide member 27 in the opposite direction by acting as abutments for upwardly extending branch 28.

Between the ends of branch 34 of control slide member 27 is an off-set portion, generally arcuate in shape, which is itself divided into an upper arcuate portion 39a and a lower arcuate portion 39b which are off-set relative to each other. Between upper arcuate portion 39a and lower arcuate portion 39b is a step 40, shown in Figures 3 and 6 to 10, inclusive, which constitutes a secondary blocking portion the purpose of which will appear hereinafter. The upper end of off-set portion 39a constitutes the blocking portion as will also appear later.

At the inboard end of horizontally extending branch 34 of control slide member 27 is a leaf spring 42 urging flange 35, and therefore control slide member 27, into the relationship to the other parts which it assumes in the door-latched position illustrated in Figure 3. Upper end 43 of leaf spring 42 bears against flange 35 while lower end 44 of leaf spring 43 projects through and is bent into contact with lower end wall 11b of cover plate 8. A portion of leaf spring 42 between upper end 43 and lower end 44 engages flange 7a on cover plate 7. When plunger 31 is operated from the exterior of the vehicle, leaf spring 42 resists, and must be overcome to permit, movement of control slide member 27 in unlatching direction.

As shown in Figures 1, 5 and 11 to 13, provision is further made for interior or remote control actuation of control slide member 27, including an operating arm 45 which makes contact with the side of extension 35a opposite from spring 42. Operating arm 45, as indicated in Figures 3, 6 and 10, is firmly attached to a longitudinally extending remote control shaft 46, as at 45a. Shaft 46 is mounted between the door panels 1 and 2 inside door D for limited rotary movement. The inner end of shaft 46 is journaled at 47 (Figure 11) in cover plate 8 of housing H. At its opposite end shaft 46 is characterized by a depending portion 52 that leads to a remote control station accessible from inside the vehicle.

Figure 1:
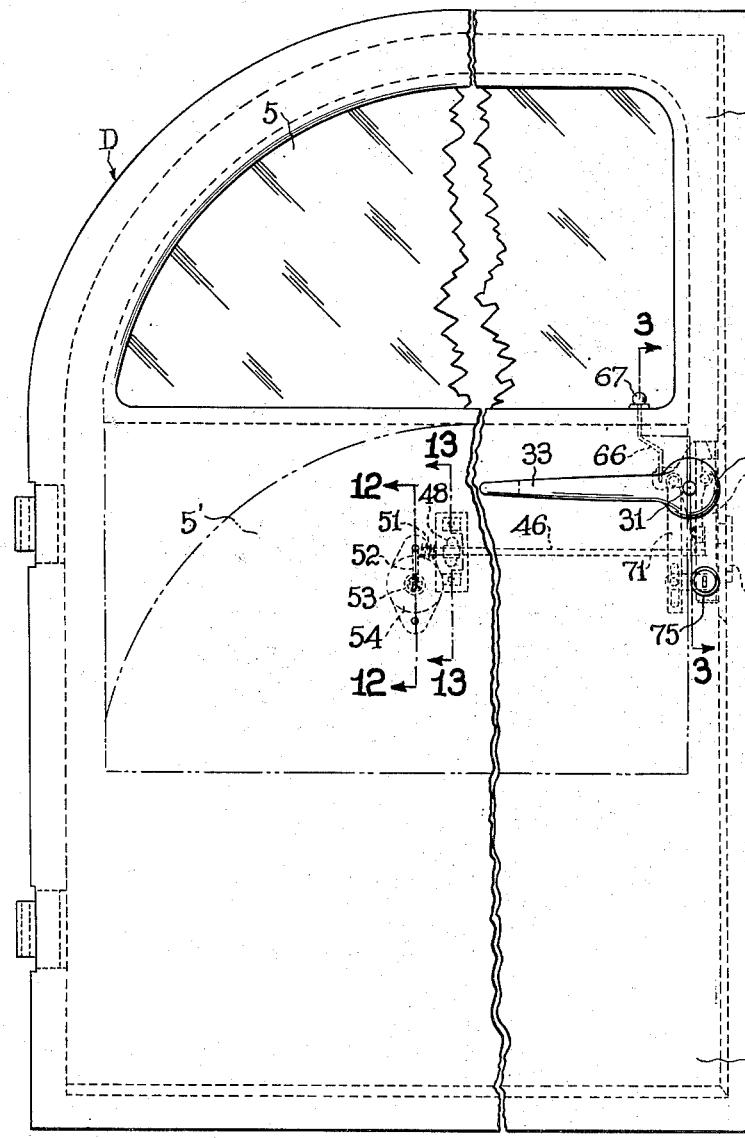
Figure 1 is a side elevation of a vehicle door in which my latch mechanism is incorporated, but on a reduced scale as compared with certain of the other figures.
Figure 2:
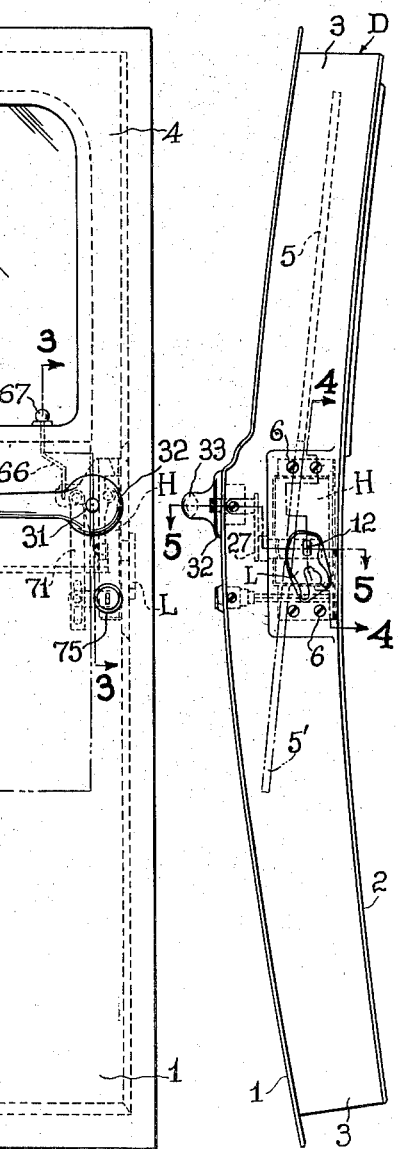
Figure 2 is an end elevation of the same door, looking at the free edge thereof and likewise on a reduced scale as compared with certain of the other figures.
Figures 12, 13:
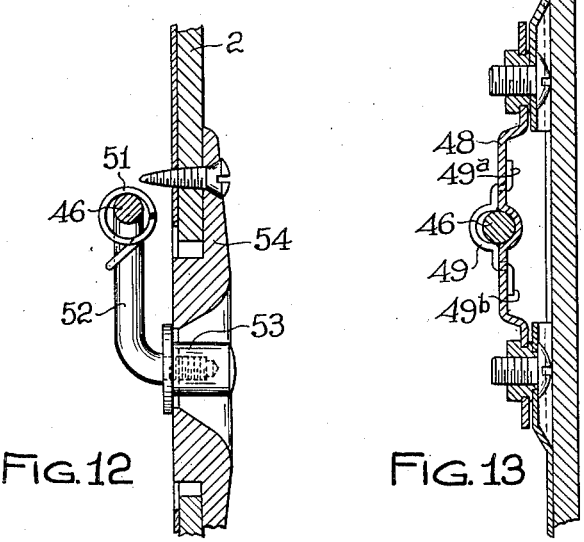
Figure 12 is an enlarged vertical cross-sectional view of the remote control push button, etc., taken substantially on line 12—12 of Figure 1.
Figure 13 is an enlarged vertical cross-sectional view of the remote control shaft and bracket taken substantially on line 13—13 of Figure 1.

Adjacent the depending portion 52 of shaft 46 is a mounting bracket 48, shown in Figures 1 and 13, which is mounted on inner panel 2 of door D. To hold shaft 46 in the desired relation to mounting bracket 48 a strap-like retaining member 49 is employed, the ends 49a and 49b of which extend through and are bent to secure them to the body portion of mounting bracket 48. Adjoining mounting bracket 48 is a coil spring 51 biasing shaft 46 in an angular direction such as to effect engagement between operating arm 45 and extension 35a of flange 35 on control slide member 27. One end of coil spring 51 abuts the depending portion 52 of shaft 46, to which is affixed a push button assembly 53 surrounded by a shield 54 forming part of the remote control station (see Figure 12).

In order to enable the door control mechanism to be locked a generally T-shaped restraining member 55 is provided which is shown to best advantage in Figures 4 and 11 but which appears also in Figures 3, 6 and 10. Restraining member 55 is pivoted on a pin 56 for movement between latch-locked position (Figure 3) and a latch-unlocked position (Figure 11). As seen in Figures 3, 6 and 10, restraining member 55 includes an upper off-set portion 57 which is spaced somewhat from flange 7a of housing H in order to permit positioning of a snap-over spring 58 in the space so provided. As shown in Figures 4 and 11, a hole 59 is formed in upper off-set portion 57 for receiving the free end 61 of snap-over spring 58, while the fixed end 62 of snap-over spring 58 is anchored in flange 7a, passing through a hole 60 therein.

Upper off-set portion 57 of restraining member 55 includes a polygonal abutment member 63 which, when restraining member 55 is in its latch-unlocked position, abuts base plate 7 as indicated in Figure 11.

Restraining member 55 is characterized also by a lower off-set portion 64 spaced from flange 7a of base plate 7. Lower off-set portion 64 includes a latch plate engaging element 65 illustrated in Figure 4 in the position which it assumes when member 55 is in latch-locked position. When in this locked position element 65 projects into the notch 15 in latch plate 13. Snap-over spring 58 maintains the parts in this position, thereby effectively blocking rotary movement of latch plate 13 until such time as restraining member 55 is moved into latch-unlocked position.

The latch-unlocked position of restraining member 55 is shown in solid lines in Figure 11; in such position, snap-over spring 58 urges restraining member 55 and latch plate engaging portion 65 thereof in unlatching direction and out of blocking engagement with latch plate 13.

For manually moving restraining member 55 between its two positions, an actuating rod 66 is provided. Actuating rod 66 has a grasping portion 67 at the upper end thereof by which it may be moved from the solid line position shown in Figure 4 to the dotted line position indicated therein by 66'; at the same time, grasping portion 67 assumes the dotted line position indicated by 67'. When grasping portion 67 and actuating rod 66 are in the elevated position, respectively indicated by 67' and 66', restraining member 55 occupies the unlocked position shown in solid lines in Figure 11. When grasping portion 67 and actuating rod 66 are in their depressed position, restraining member 55 is of course in the solid line locked position illustrated in Figure 4; i. e., in position to prevent movement of latch plate 13 and latch member L from door latched to door unlatched position.

The bent end of actuating rod 66 opposite grasping portion 67 is received within a hole 68 in the inwardly extending shank of restraining member 55 which is split as shown in Figures 4 and 11 to provide a retaining finger 69 which prevents inadvertent separation of the parts.

Figures 3, 4 and 11 also show the manner of employment of key-controlled actuating means, operating independently of actuating rod 66, for moving restraining member 55 between latch-locked and latch-unlocked positions. Such key-controlled actuating means include a link 71 pivoted on a pin 72 located in the inwardly extending shank of restraining member 55. At its lower end, link 71 is connected to a lever 73 by a pin and slot connection designated generally 73a. The inner end of lever 73 is pivotally mounted on housing H and square shaft 74 forms a connection from cylinder lock 75 to lever 73 (see Figure 3). Cylinder lock 75, which is operated by a key (not shown), permits of limited movement of lever 73 between the two dotted line positions 73' and 73" shown in Figure 4. In the upper of these positions, lever 73, acting at the upper end of the slot in link 71, forces restraining member 55 out of engagement with latch plate 13; in the lower of these positions, lever 73, acting at the lower end of the slot in link 71, forces latch-restraining member 55 into engagement with latch plate 13.

With the parts in the relationship shown in Figure 3, that is to say with latch plate 13 and latch member L in door-latched position and with restraining member 55 in latch-locked position, operation of the mechanism to permit opening of the door involves first moving restraining member 55 from the locked position shown in full lines in Figure 4 to the unlocked position shown in full lines in Figure 11. From the inside of the vehicle this may be done by pulling upward on grasping portion 67 of actuating rod 66. From the outside of the vehicle, the same result may be accomplished by turning the key in cylinder lock 75 in a direction such as to move lever 73 into the upper dotted line position 73' shown in Figure 4. Until the unlocking operation has been done, either from inside or from outside the vehicle, latch plate 13 and latch member L are effectively held against movement into unlatched position.

Assuming that the door is closed and latched and that restraining member 55 is in unlocked position and it is desired to open the door, the first step is for the operator to grasp handle 33 and at the same time press plunger 31 in until it reaches the position indicated in dotted lines in Figure 5 and in full lines in Figure 10. The result is to move control slide member 27 into a fully retracted position in which there is no opportunity for interference between either the blocking portion (the upper end of off-set 39a) or the secondary blocking portion (the step 40) of control slide member 27 and latch plate 13. By simultaneously exerting a pull on handle 33 to move door D to the right as seen in Figure 3, latch member L, due to its engagement with keeper pin P, is caused to rotate clockwise as seen in Figures 3, 6 and 10 until latch plate 13 and latch member L assume the door-unlatched positions shown in Figure 10, by which time arcuate flange 22 on latch stop portion 21 encompasses lower off-set portion 39b of control slide member 27, thereby preventing return movement of control slide member 27 from the retracted position shown in Figure 10 to the blocking position of Figure 3.

Comparable actuation and operation of door D from within the vehicle, restraining member 55 being in latch-unlocked position, involves the application of pressure to push button assembly 53, which results in movement of operating arm 45 from the position shown in solid lines in Figures 3 and 10 to the position shown in phantom lines in Figure 10, coupled with the exertion of pressure against door D until it has swung from closed to open position. At this time, pressure on push button assembly 53 may be released, permitting operating arm 45 to return from the phantom line position shown in Figure 10 to its normal erect position shown in full lines in each of Figures 3, 6 and 10. Control slide member 27 is not, however, thereby permitted to return to its initial position, being held in retracted position in consequence of the fact that lower off-set portion 39b is encompassed by arcuate flange 22 as indicated in Figure 10.

This state of affairs, which obtains so long as door D continues in open position, is characterized, among other things, by the fact that plunger 31 remains retracted within guide 32.

Assuming now that it is desired to close door D, the latter is pushed from the outside or pulled from the inside of the vehicle until latch member L engages pin P, when rotary movement of latch plate 13 is initiated. If the closing force is sufficiently strong, latch plate 13 as seen in Figure 10 moves counterclockwise until arcuate flange 22 moves completely out of engagement with control slide member 27, thus permitting control slide member 27 to return to its normal blocking position of Figure 3. By this time, snap-over spring 23 has ceased to urge the latch plate 13 in unlatching direction and urges it, together with latch member L, in latching direction. When abutting face 17 on abutment portion 14 strikes flange 7a, rotary movement of latch plate 13 in latching direction necessarily ceases.

Latch member L has of course now attained the position indicated in Figure 3; that is to say, it is in door-latched position. If it is desired to lock the door restraining member 55 may then be moved into latch-locked position as shown in Figures 3 and 4. This may be done by downward movement of grasping portion or knob 67 on actuating rod 66 or by turning the key in cylinder lock 75 in a direction such as to cause lever 73 to move into the lower phantom line position 73'', indicated in Figure 4. At this stage, the parts are again in door-latched and locked position.

Between the above described latched and unlatched positions of door D is an intermediate or secondary latched position illustrated in Figure 6 in which arcuate flange 22 on latch plate 13 abuts step 40 which constitutes a secondary blocking portion between off-set portion 39a and off-set portion 39b of control slide member 27. In this secondary blocking position of control member 27, off-set portion 39a is encompassed by arcuate flange 22, as shown, for example, in Figure 7 and control slide member 27 is slightly retracted, as indicated by the clearance appearing in Figure 6 between flange 35a and the end of rectangular slot 37 in cover plate 8. If the force employed in pushing or pulling door D toward closed position is insufficient to effect complete closing of the door against the co-acting portion of body T, latch plate 13 and latch member L will be held in secondary latched position by the blocking action of step 40 against the end face of flange 22 as seen in Figure 6. Thus the door will be held in secondary latched position even though not fully closed and latched.

The application of further force in closing direction continues the counterclockwise movement of latch plate 13 and permits the parts to move from the intermediate or secondary latched position illustrated in Figure 6 to the latched position shown in Figures 3 and 4. The door may of course stop in the secondary latched position if improperly closed but will usually move through the secondary into the latched position. The latch releasing force applied to plunger 31 or push button assembly 53 when it is desired to unlatch and open the door should be sufficient to move control slide member 27 past the slightly retracted position of Figure 6 into fully retracted position shown in Figure 10 in which the latch member L is completely released for unlatching movement.

A modified form of latch mechanism is shown in Figures 14 to 18, from which, for the sake of simplicity, are omitted certain elements normally used therewith as the restraining or locking mechanism. The principle upon which the latch mechanism of Figures 14 to 18 operates is similar to that of the latch mechanism already described. A principal point of difference resides in the fact that the modified mechanism of Figures 14 to 18 employs a different type of snap-over spring mechanism and has no intermediate or secondary latched position between the latched and unlatched positions of the latch plate and latch member.

In the latch mechanism of Figures 14 to 18 a base plate 80 is employed which has on one side thereof a long flange 81 that is turned inward at right angles to base plate 80. Just below the middle of long flange 81 is a vertical slot 82 (see Figure 15) that helps position the cover plate.

On the opposite side of base plate 80 is a short flange 83 which, like flange 81, projects inward at right angles thereto, although not so far inward as flange 81. Short flange 83 is characterized, at a point opposite slot 82 in long flange 81, by a cut-away portion 84 in the inner edge thereof which, as seen in end elevation in Figure 18, is generally channel-shaped. Above and below cut-away portion 84 are guides 85a and 85b which are integral with short flange 83 and are struck up therefrom when channel-shaped cut-away portion 84 is formed therein.

Extending parallel to base plate 80 and making contact at its vertical edges with long flange 81 on one side and short flange 83 on the other side of base plate 80 is a cover plate 87, itself provided with a bottom flange 87a that is turned toward and abuts against base plate 80. Cover plate 87 is provided on the side which abuts short flange 83 by a tongue 86 and on the opposite side; that is to say, the side which cooperates with long flange 81, by a tongue 88. The latter slides into and projects through slot 82 in long flange 81. Formed integrally with tongue 86 on the side of cover plate 87 which cooperates with short flange 83 are lips 89a and 89b which are adapted to slide over and encompass guides 85a and 85b, respectively.

Control slide member 91, which is generally similar to control slide member 27, extends through channel-shaped cut-away portion 84 in short flange 83 into the housing formed by base plate 80 and cover plate 86. Control slide member 91 differs from control slide member 27 in that it has a single off-set portion 92, extending laterally, which is not itself divided into upper and lower off-set portions but instead is characterized by a smooth contour of arcuate configuration. Control slide member 91 is provided at its inboard end with an in-turned flange 93 which carries thereon a projecting extension 94 that extends inwardly through an opening 95 in cover plate 87. It is guided in its lateral movement by means of two in-turned guide flanges, 96a and 96b, which are formed integrally with cover plate 87 above and below opening 95. A leaf spring 97 is positioned between projecting extension 94 and long flange 81, its lower end 97a projecting through an opening in bottom flange 87a of cover plate 87.

Cooperating with projecting extension 94 is an operating arm 98 which is rigidly affixed, as at 98a, to a shaft 99 forming part of a manually operated remote control actuating mechanism mounted inside the vehicle door.

Latch plate 101 is generally similar to latch plate 13, having a rounded lower portion and an irregularly shaped upper portion. The latter includes an abutment portion 102 which makes contact with long flange 81 or short flange 83, as the case may be, depending on the position of latch plate 101. It also includes a latch stop portion 103 provided with an in-turned arcuate flange 103a adapted to encompass off-set portion 92 on control slide member 91. Between abutment portion 102 and stop portion 103 is a V-notch 104. On the opposite side of abutment portion 102 is a rectangular notch 105 by means of which locking engagement may be made with a restraining member (not shown but which may be similar to that illustrated in the embodiment of Figures 1 to 13). Latch plate 101 is normally in one or the other of the two terminal positions shown in Figures 14 and 15 and in moving from one to the other passes through but does not stop in other intervening positions.

Near the top of abutment portion 102 of latch plate 101 is a stud 106 which projects through and is pivoted for angular movement relative to abutment portion 102. At the inner end thereof, stud 106 carries a ring-shaped retainer 107 which is integral with stud 106. An L-shaped bracket 108 pvoted at 108a on base plate 80 coacts with ring-shaped retainer 107. Between them is disposed a compression spring 109 which is held in position by a spring guide pin 110 secured to bracket 108. As the assembly shown in Figure 16 moves between the latched position of Figure 14 and the unlatched position of Figure 15, pressure on compression spring 109 first increases from a minimum to a maximum, corresponding to a straight-line position, and then decreases to a minimum. On the two sides of its mid-position, compression spring 109 urges latch plate 101 clockwise or counterclockwise, depending on the position of the spring axis. The operation of the device of Figures 14 to 18 is substantially like that of Figures 1 to 13 except that the secondary latched position is omitted.

A further modification is shown in Figures 19 to 22. In the embodiment of the invention therein illustrated, base plate 120 has a long flange 121 extending inward throughout the full length thereof and, on the opposite side, a short flange 122 likewise extending inwardly. Cooperating with these elements is a cover plate 123, generally similar to cover plate 8, having upper and lower end walls 124a and 124b parts of which project through base plate 120 and are bent over into contact therewith as shown, for example, near the bottom of Figure 21. Thus base plate 120 and cover plate 123 together make up a housing very similar to housing H already described.

Cover plate 123 has near the top thereof a round opening 125 and, toward the bottom thereof, an arcuate slot 126. The upper lefthand corner of cover plate 123 is cut-away as seen at 127 in Figures 19 and 20. The space so provided is adapted to accommodate a locking or restraining member (not shown). Adjoining the cut-away 127 is an open slot 128 defined in part by upper and lower in-turned guide flanges 129a and 129b, which guide flanges are integral with cover plate 123. Although differently positioned in that it is located at a somewhat higher level, slot 128 is analogous to and serves the same purposes as slot 37 and opening 95 in the two embodiments of the invention previously described. Below the level of slot 128, cut-away portion 127 terminates at a level such as to enable it to receive the lowermost parts of a locking or restraining member of the type shown in Figures 1 to 13.

A control slide member 131 is employed which is similar to control slide member 91 in the embodiment of the invention shown in Figures 14 to 18, but specifically different in respects hereinafter explained. Like control slide member 91, it is characterized by a lateral off-set 132 which is not broken into upper and lower off-set portions but takes the form of a smooth curved surface of arcuate conformation. At its opposite or inboard end, control slide member 131 has an in-turned flange 133 which extends inward toward, but does not project through, cover plate 123. A leaf spring 134 similar to springs 42 and 97 in the embodiments of the invention previously described is mounted in contact with long flange 121. Its upper and lower ends respectively engage end flange 133 on control slide member 131 and the bottom flange which forms lower end wall 134b of cover plate 123.

Projecting from the body of control slide member 131 near the inboard end thereof is an upwardly extending portion 135, formed as shown in Figure 19. It has on one side thereof an inturned flange 136 which projects into slot 128 between upper and lower guide flanges 129a and 129b. Cooperating therewith is a depending operating arm 137 fixed to remote control shaft 138 as at 137a. Operating arm 137 depends from shaft 138 in juxtaposition to inturned flange 136 on upwardly extending portion 135 of control slide member 131. Positioning operating arm 137 and shaft 138 in the manner shown in Figures 19 and 20 permits the remote control system used in manually actuating control slide member 131 from within the vehicle to be located at approximately the level of the handle on the exterior of the vehicle. This arrangement may be desirable in some installations.

Latch plate 140 is similar to latch plate 101 in the embodiment of the invention illustrated in Figures 14 to 18. It is characterized by an abutment portion 141, by a latch plate stop portion 142 having thereon an arcuate flange 142a, and by a notch 143 adapted to receive the latch-plate engaging element of a locking or restraining member (not shown), such rectangular notch 143 coinciding generally with the lowermost part of cut-away portion 127 when latch plate 140 is in latched position shown in Figure 19.

Opposite abutment portion 141, latch plate 140 carries a downwardly projecting extension 144 equipped with an in-turned flange 145. One end of a tension spring 146 passes through a suitable opening in flange 145, being held against displacement by the bent end portion 146a forming part thereof. The other end of tension spring 146 surrounds a fixed stud 147 mounted on base plate 120 and projecting through opening 125 in cover plate 123. As latch plate 140 moves between the latched and unlatched positions indicated respectively in Figures 19 and 20, the lower end of tension spring 146 moves from one end to the other of arcuate slot 125. Tension on the spring increases from a minimum at one end of the travel of flange 145 to a maximum when the center line of the spring crosses the center of rotation of latch plate 140 and decreases again as flange 145 moves to the opposite end of its travel in slot 126. When in the position of Figure 19 the spring 146 tends to hold latch plate 140 and latch member in latched position but when in the position of Figure 20 it tends to hold the parts in their unlatched positions. Thus the operation of this embodiment is substantially the same as that of Figures 14 to 18.

In the various embodiments of the invention heretofore described, two steps are necessary to go from door-latched to door-unlatched position. One of these steps involves the application to the control slide member of a manually imposed force, exerted either from an inside remote control station or from outside as on push button 31 in the embodiment of the invention shown in Figures 3 to 13. The second step is the application of an opening force to the door itself which will operate to cause latch member L to slide over keeper pin P, this operation giving rise to rotary movement of the latch plate.

The embodiment of the invention shown in Figures 23 to 27 has for an object to avoid the necessity for exerting a direct opening force on the door, at least insofar as concerns operation of the door from the interior of the vehicle. Pursuant to the method of operation inherent to the apparatus in Figures 23 to 27, only a single force, such as rotation of a handle or other device located at the remote control station on the inside of the vehicle door, is necessary to effect opening of the door. As regards a person on the outside of the vehicle, the mechanism illustrated in Figures 23 to 27, does not change the previously described state of affairs; that is to say, the initial application of a manual force to operate the control slide member must still be followed by the application of a force to move the door in opening direction and thus rotate the latch plate and latch member into unlatched position.

The mechanism of Figures 23 to 27 includes a base plate 150 having on one side thereof a long flange 151 extending inward from top to bottom thereof and, on the opposite side thereof, a short flange 152. Cooperating with base plate 150 to form a housing is a cover plate 153 which does not abut either long flange 151 or short flange 152 but is held in place by end walls 154a and 154b, portions of which are turned toward each other on the opposite side of base plate 150. As seen in Figure 23, cover plate 153 is characterized by an open slot 155 on the side thereof next to long flange 151.

A control slide member 156, similar to the control slide member 27 of Figures 1 to 13, extends into the housing so formed and is guided on one side thereof by upper and lower housing lips 157a and 157b and, on the opposite side thereof, by the disposition in slot 155 of an in-turned end flange 158 on the control slide member itself. Like the control slide member illustrated in the embodiment of the invention shown in Figures 19 to 22 and unlike the control slide member shown in previously described embodiments of the invention, control slide member 156 has no inwardly projecting extension or in-turned end flange 158; instead, leaf spring 159 presses directly against the posterior or far face of end flange 158. The opposite end, 159a, projects through lower wall 154b of cover plate 153, being suitably bent to preclude possible displacement. Control slide member 156 is characterized by a lateral off-set which is itself divided into upper and lower off-sets 160a and 160b, much as in the embodiment of the invention shown in Figures 1 to 13.

Latch plate 161 is similar to the latch plate incorporated in the latch mechanism shown in Figures 1 to 13, being characterized by a latch stop portion 162 provided with an in-turned arcuate flange 162a. Elsewhere, latch plate 161 is characterized by an abutment portion 163 which comes to rest against long flange 151 or short flange 152, depending on whether the latch plate 161 is in the latched position of Figure 23 or the unlatched position of Figure 27. Abutment portion 163 coacts with a snap-over spring 164, the fixed end of which, 165, projects into a hole in cover plate 153 and the free end of which, 166, projects in the opposite direction through a hole in abutment portion 163. To avoid interference between the parts, base plate 150 is provided with an arcuate slot 167 into which projects free end 166 of snap-over spring 164. Latch plate 161 is carried upon a shaft 168, journaled in base plate 150, to the opposite end of which is fixed latch member L with legs L' and L" as shown in Figures 23, 24 and 27.

Mounted on long flange 151 is a T-shaped restraining member 169 like that shown in Figures 1 to 13 and similarly operable by a manually-controlled actuating rod or a key-controlled lever having a pin-and-slot connection with a link depending from the shank of latch-restraining member 169. These parts are not described in detail as they are substantially the same as those previously described.

A remote control system including a suitable inside rotary handle (not shown) is provided, this handle being connected to operate a remote control shaft 171 journaled at 171a at base plate 150. On shaft 171 near the point where the shaft is journaled in base plate 150 is an operating arm 172 which has formed integrally therewith an annular hub portion 173 bearing against and fitting into a suitably formed opening in cover plate 153. Operating arm 172 has a finger 174 projecting laterally therefrom which is best seen in Figures 23 and 26. As shown in Figure 24, operating arm 172 is bent inward out of a vertical plane, this for the purpose of enabling it to make contact through finger 174 with a rotary actuating member 175 supported on cover plate 153 as by a pivot pin 176. Rotary actuating member 175 has a depending portion 177 through which contact is made with finger 174 on operating arm 172.

Proceeding clockwise around the periphery of rotary actuating member 175 from depending portion 177, next to be encountered is an angular portion 178 engaging the anterior or near face of in-turned flange 158 on control slide member 156. Angular portion 178 is characterized by a relatively sharp but nevertheless slightly rounded corner 179, on opposed sides of which are two flat surfaces 181a and 181b. In door-latched position, shown in Figure 23, surface 181a abuts against flange 158; in door-unlatched position, shown in Figure 27, surface 181b abuts against flange 158. In the intermediate positions, such as that illustrated in Figure 26, rotary actuating member 175 assumes a position in which contact with flange 158 is by corner 179.

Continuing clockwise around rotary actuating member 175, surface 181a, extends in a generally upward direction to form part of latch-plate moving portion 182. The latter is characterized, among other things, by a flat side 183 adapted to make contact with the adjacent end of arcuate flange 162a on latch stop portion 162 of latch plate 161. In proceeding from the position shown in Figure 23 through that shown in Figure 26 to that shown in Figure 27, latch-plate moving portion 182 first makes contact with arcuate flange 162a on latch stop portion 162, after which continued exertion of force on rotary actuating member 175 through operating arm 172 and shaft 171 results in clockwise movement of latch plate 161, which ultimately comes to rest in the unlatched position shown in Figure 27.

At this stage, rotary actuating member 175 itself comes to rest as a result of the fact that flat surface 181b abuts the anterior face of flange 158 on control slide member 156. The latter, by virtue of movement of corner 179 in a clockwise direction, has already been fully retracted so that off-set portions 160a and 160b are out of the path of latch stop portion 162 of latch plate 161 (see Figure 27). Thus a single continuously acting force exerted at the remote control station on a handle or other device associated with shaft 171 first effects retraction of control slide member 156 and then causes rotation of latch plate 161 into unlatched position, this as a result of the coaction of operating arm 172 and rotary actuating member 175.

With the parts in the position shown in Figure 27, a closing force applied to the door will result in rotation of latch member L and, with it, shaft 168 and latch plate 161. The direction of rotation will be counterclockwise as seen in Figure 27. As such movement proceeds, arcuate flange 162a on latch stop portion 162 of latch plate 161 will likewise move counterclockwise, clearing first lower off-set portion 160b on control slide member 156 and, provided the force is sufficiently great, also upper off-set portion 160a. If, however, the force is insufficient fully to close the door and to cause stop portion 162 to clear both upper and lower off-set portions 160a and 160b, latch plate 161 comes to rest with arcuate flange 162a of latch stop portion 162 in contact with the step formed between upper and lower off-set portions 160a and 160b. The parts are then in their secondary latched positions. Resumption of the closing force, if so interrupted, results in further movement of latch plate 161 in a counterclockwise direction, clearing upper off-set portion 161a and permitting control slide member 156 and rotary actuating member 165 to return to the latched position illustrated in Figure 23.

Although several different embodiments of the door control mechanisms of the invention have been illustrated and described in detail, it will be apparent to those skilled in the art that variations and modifications, whether by way of simplification or elaboration, may be made as desired in the arrangement, form, proportions and manner of co-action of the various elements. It will further be apparent that the door control mechanisms of the invention may be adapted to make use of mechanisms of other types than those as specifically illustrated and described in the invention. The invention is therefore not to be understood as limited to the particular devices shown and described but as contemplating all embodiments thereof coming within the scope of the appended claims.

It is intended that the patent shall cover, by suitable expression in the appended claims, whatever features of patentable novelty reside in the invention.

I claim:

1. A door latch mechanism comprising a frame structure, a latch member supported by said frame structure for rotary movement relative thereto between a door latched position and a door unlatched position, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position. said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for limited rotary movement with said latch member and having an inwardly extending arcuate flange portion, a control slide member, means on said frame structure for supporting and guiding said control slide member for straight line sliding movement transversely of the axis of rotation of said latch member between a latch stop member blocking position and a latch stop member released position, control slide spring means effective at all times to urge said control slide member toward its said blocking position, said control slide member having an outwardly extending arcuate portion one end of which is disposed in the path of movement of one end of said inwardly extending arcuate flange portion on said latch stop member when said latch member is in door latched position and said control slide is in said blocking position whereby movement of said latch member into door unlatched position is blocked. said inwardly extending arcuate flange portion of said latch stop member being adapted, when said control slide has been moved into said released position and said latch member has been moved into door unlatched position, to be engaged by said outwardly extending arcuate portion of said control slide member whereby said control slide is held in said released position against the action of said control slide spring means, said arcuate portions of said latch stop member and said control slide member being formed on radii drawn from the center of rotation of said latch member, and manually operable means for moving said control slide from said blocking to said released position.

2. A door latch mechanism comprising a frame structure, a latch member supported by said frame structure for limited rotary movement relative thereto between a door latched position and a door unlatched position, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for limited rotary movement with said latch member and having an inwardly extending arcuate flange portion, a control slide member, means on said frame structure for supporting and guiding said control slide member for straight line sliding movement transversely of the axis of rotation of said latch member between a latch stop member blocking position and a latch stop member released position, control slide spring means effective at all times to urge said control slide member toward its said blocking position, said control slide member having an outwardly extending arcuate portion one end of which is disposed in the path of movement of one end of said inwardly extending arcuate flange portion on said latch stop member when said latch member is in door latched position and said control slide is in said blocking position whereby movement of said latch member into door unlatched position is blocked, said inwardly extending arcuate flange portion of said latch stop member being adapted, when said control slide has been moved into said released position and said latch member has been moved into door unlatched position, to be engaged by said outwardly extending arcuate portion of said control slide member whereby said control slide is held in said released position against the action of said control slide spring means, said arcuate portions of said latch stop member and said control slide member being formed on radii drawn from the center of rotation of said latch member, manually operable means for moving said control slide from said blocking to said released position, a restraining member supported on said frame structure for movement between a latch locked position and a latch unlocked position, a restraining member engaging element supported for movement with said latch member, said restraining member when in said locked position being in the path of said element whereby movement of said latch member from door latched position into door unlatched position is prevented, and manually operable means for moving said restraining member between said latch locked and unlocked positions.

3. A door latch mechanism comprising a frame structure, a latch member supported by said frame structure for limited rotary movement relative thereto between a door latched position and a door unlatched position, a latch plate supported for movement with said latch member, a snap-over spring anchored at one end to said frame structure and having its other end operatively connected to said latch plate, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member on said latch plate having an inwardly extending arcuate flange portion, a control slide member means on said frame structure for supporting and guiding said control slide member for straight line sliding movement transversely of the axis of rotation of said latch plate between a latch stop member blocking position and a latch stop member released position, control slide spring means effective at all times to urge said control slide member toward its said blocking position, said control slide member having an outwardly extending arcuate portion one end of which is disposed in the path of movement of one end of said inwardly extending arcuate flange portion on said latch stop member when said latch member is in door latched position and said control slide is in said blocking position whereby movement of said latch member into door unlatched position is blocked, said inwardly extending arcuate flange portion of said latch stop member being adapted, when said control slide has been moved into said released position and said latch member has been moved into door unlatched position, to be engaged by said outwardly extending arcuate portion of said control slide member whereby said control slide is held in said released position against the action of said control slide spring means, said arcuate portions of said latch stop member and said control slide member being formed on radii drawn from the center of rotation of said latch member, and manually operable means for moving said control slide from said blocking to said released position.

4. A door latch mechanism comprising a frame structure, a latch member supported by said frame structure for limited rotary movement relative thereto between a door latched position and a door unlatched position, a latch plate supported for movement with said latch member, a snap-over spring anchored at one end to said frame structure and having its other end operatively connected to said latch plate, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member on said latch plate having an inwardly extending arcuate flange portion, a control slide member, means on said frame structure for supporting and guiding said control slide member for straight line sliding movement transversely of the axis of rotation of said latch plate between a latch stop member blocking position and a latch stop member released position, control slide spring means effective at all times to urge said control slide member toward its said blocking position, said control slide member having an outwardly extending arcuate portion one end of which is disposed in the path of movement of one end of said inwardly extending arcuate flange portion on said latch stop member when said latch member is in door latched position and said control slide is in said blocking position whereby movement of said latch member into door unlatched position is blocked, said inwardly extending arcuate flange portion of said latch stop member being adapted, when said control slide has been moved into said released position and said latch member has been moved into door unlatched position, to be engaged by said outwardly extending arcuate portion of said control slide member whereby said control slide is held in said released position against the action of said control slide spring means, said arcuate portions of said latch stop member and said control slide member being formed on radii drawn from the center of rotation of said latch member, manually operable means for moving said control slide from said blocking to said released position, a restraining member supported on said frame structure for movement between a latch locked position and a latch unlocked position, a restraining member engaging element supported for movement with said latch member, said restraining member when in said locked position being in the path of said element whereby movement of said latch member from door latched position into door unlatched position is prevented, and manually operable means for moving said restraining member between said latch locked and unlocked positions.

5. A door latch mechanism comprising a frame structure including a base plate, a shaft supported by said frame structure, a latch member rotatable about the axis of said shaft and disposed on one side of said base plate, a latch plate rotatable with said latch member and disposed on the opposite side of said base plate, said latch plate having a latch stop portion, a locking abutment portion, and a spring receiving slot extending at an oblique angle to radii drawn from the center of rotation of said latch plate through the ends of said slot, a snap-over spring having a coil portion and spaced end portions, one of said end portions being anchored on said frame structure and the other end portion extending into said slot, said latch member being movable between a door latched position and a door unlatched position, said slot being positioned on one side of the common center line of said shaft and said one end of said spring when said latch member is in door latched position and on the other side of said common center line when said latch member is in door unlatched position, said spring being loaded to a maximum degree when said other end of said spring is on said common center line and to a lesser degree when said other end is on either side of said center line, and control means for selectively blocking said stop portion of said latch plate against movement from door latched to door unlatched position and releasing said stop portion to permit movement from door latched to door unlatched position.

6. A door latch mechanism comprising a frame structure including a base plate, a shaft supported by said frame structure, a latch member rotatable about the axis of said shaft and disposed on one side of said base plate, a latch plate rotatable with said latch member and disposed on the opposite side of said base plate, said latch plate having a latch stop portion, a locking abutment portion, and a spring receiving slot extending at an oblique angle to radii drawn from the center of rotation of said latch plate through the ends of said slot, a snap-over spring having a coil portion and spaced end portions, one of said end portions being anchored on said frame structure and the other end portion extending into said slot, said latch member being movable between a door latched position and a door unlatched position, said slot being positioned on one side of the common center line of said shaft and said one end of said spring when said latch member is in door latched position and on the other side of said common center line when said latch member is in door unlatched position, said spring being loaded to a maximum degree when said other end of said spring is on said common center line and to a lesser degree when said other end is on either side of said center line, control means for selectively blocking said stop portion of said latch plate against movement from door latched to door unlatched position and releasing said stop portion to permit movement from door latched to door unlatched position, and restraining means supported on said frame structure for movement into and out of the path of said locking abutment portion.

7. A door latch mechanism comprising a frame structure, a latch member supported by said frame structure for movement relative thereto between a door latched position and a door unlatched position, said latch member also having a secondary latched position between said latched and unlatched positions, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for movement with said latch member, a control slide member supported by said frame structure for straight line sliding movement between a latch stop member blocking position and a latch stop member released position, said control slide member having a secondary blocking position between said blocking and released positions, means for urging said control slide member toward its said blocking position, said control slide member having an arcuate blocking portion one end of which is disposed, when said stop member is in door latched position and said control member is in blocking position, in the path of movement of said latch stop member whereby substantial movement of said latch member toward door unlatched position is blocked, said control slide member also having a secondary arcuate blocking portion spaced from said first named arcuate blocking portion and adapted to block said stop member in secondary latched position, and means operable from a side of a door with which the latch mechanism is associated for moving said control slide member from said blocking to said released position, said latch stop member having an arcuate portion adapted, when said control slide member has been moved toward said released position and said latch member has been moved into either secondary latched or unlatched position, to engage one of said arcuate portions of said control slide member and hold same against movement into said blocking position until said latch member has been returned to door latched position.

8. A door latch mechanism comprising a frame structure, a latch member supported by said frame structure for movement relative thereto between a door latched position and a door unlatched position, said latch member also having a secondary latched position between said latched and unlatched positions, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for movement with said latch member, a control slide member supported by said frame structure for straight line sliding movement between a latch stop member blocking position and a latch stop member released position, said control slide member having a secondary blocking position between said blocking and released positions, means for urging said control slide member toward its said blocking position, said control slide member having an arcuate blocking portion one end of which is disposed, when said stop member is in door latched position and said control member is in blocking position, in the path of movement of said latch stop member whereby substantial movement of said latch member toward door unlatched position is blocked, said control slide member also having a secondary arcuate blocking portion spaced from said first named arcuate blocking portion and adapted to block said stop member in secondary latched position, means operable from a side of a door with which the latch mechanism is associated for moving said control slide member from said blocking to said released position, said latch stop member having an arcuate portion adapted, when said control slide member has been moved toward said released position and said latch member has been moved into either secondary latched or unlatched position, to engage one of said arcuate portions of said slide member and hold same against movement into said blocking position until said latch member has been returned to door latched position, a latch restraining member supported on said frame structure for movement between a latch locked position and a latch unlocked position, a restraining member engaging element supported for movement with said latch member, said restraining member when in said locked position being in the path of said element whereby movement of said latch member from door latched position into door unlatched position is prevented, and manually operable means for moving said restraining member between said latch locked and unlocked positions.

9. A door latch mechanism comprising a frame structure, a latch member supported by said frame structure for movement relative thereto between a door latched position and a door unlatched position, said latch member also having a secondary latched position between said latched and unlatched positions, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for movement with said latch member between a door latched position and a door unlatched position, said stop member also having a secondary latched position between its said latched and unlatched positions, a control slide member supported by said frame structure for straight line sliding movement between a latch stop member blocking position and a latch stop member released position, said control slide member having a secondary blocking position between said blocking and released positions, said latch stop member and said control slide member having coacting portions engageable to restrain said latch member against movement into unlatched position from said latched position and from said secondary latched position, means for urging said control slide member toward its said blocking position, and means operable from a side of a door with which the latch mechanism is associated for moving said control slide member from said blocking to said released position, said latch stop member having an arcuate portion adapted, when said control member has been moved toward said released position and said latch member has been moved into either secondary latched or unlatched position, to engage correspondingly arcuate portions on said control slide member and hold same against movement into said blocking position until said latch member has been returned to door latched position.

10. A door latch mechanism comprising a frame structure, a latch member supported by said frame structure for movement relative thereto between a door latched position and a door unlatched position, said latch member also having a secondary latched position between said latched and unlatched positions, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for movement with said latch member between a door latched position and a door unlatched position, said stop member also having a secondary latched position between its said latched and unlatched positions, a control slide member supported by said frame structure for straight line sliding movement between a latch stop member blocking position and a latch stop member released position, said control slide member having a secondary blocking position between said blocking and released positions, said latch stop member and said control slide member having coacting portions engageable to restrain said latch member against movement into door unlatched position from said door latched position and from said secondary latched position, means for urging said control slide member toward its said blocking position, means operable from a side of a door with which the latch mechanism is associated for moving said control slide member from said blocking to said released position, said latch stop member having an arcuate portion adapted, when said control member has been moved toward said released position and said latch member has been moved into either secondary latched or unlatched position, to engage correspondingly arcuate portions on said control slide member and hold same against movement into said blocking position until said latch member has been returned to door latched position, a latch restraining member supported on said frame structure for movement between a latch locked position and a latch unlocked position, a restraining member engaging element supported for movement with said latch member, said restraining member when in said locked position being in the path of said element whereby movement of said latch member from door latched position into door unlatched position is prevented, and manually operable means for moving said restraining member between said latch locked and unlocked positions.

11. A door latch mechanism comprising a frame structure, a latch member supported by said frame structure for movement relative thereto between a door latched position and a door unlatched position, a snap-over spring secured at one end to said frame structure and having its other end movable with and effective upon said latch member, said other end of said spring being disposed on one side of the common center line between said one end of said spring and the center of rotation of said latch member when said latch member is in said door latched position and on the other side of said common center line when said latch member is in said door unlatched position, said spring being loaded to a maximum degree when said other end of said spring is on said common center line and to a lesser degree when said other end is on either side of said common center line whereby said latch member is urged toward said door latched position during a portion of its travel between said positions and toward said door unlatched position during the remainder of its said travel, a latch stop member supported for movement with said latch member and having an inwardly extending arcuate flange portion, a control member supported by said frame structure for movement between a latch stop member blocking position and a latch stop member released position, means effective at all times to urge said control member toward its said blocking position, said control member having an outwardly extending arcuate portion one end of which is disposed in the path of movement of one end of said inwardly extending arcuate flange portion on said latch stop member when said latch member is in door latched position and said control member is in blocking position whereby movement of said latch member into door unlatched position is blocked, an actuating member supported by said frame structure for movement between a door latched and a door unlatched position, said actuating member having a control member engaging portion and a latch member moving portion, and means operable from a side of a door with which the latch mechanism is associated for moving said actuating member from its said door latched to its said door unlatched position, said control member engaging portion being disposed to first move said control member out of its said blocking position and said latch member moving portion being disposed to then move said latch member to a point where said snap-over spring urges it toward door unlatched position, said arcuate flange portion of said latch stop member being effective when said control member has been moved into said released position and said latch member has been moved into door unlatched position, to engage said control member to hold same in said released position until said latch member has been returned to door latched position.

EDWIN L. ALLEN.

References Cited in the file of this patent

UNITED STATES PATENTS

| Number | Name | Date |
| --- | --- | --- |
| 917,664 | Roy | Apr. 6, 1909 |
| 1,221,932 | White | Apr. 10, 1917 |
| 1,269,467 | Leonard et al. | June 11, 1918 |
| 2,094,413 | Schonitzer | Sept. 28, 1937 |
| 2,146,379 | Rediger | Feb. 7, 1939 |
| 2,480,688 | Allen | Aug. 30, 1949 |
| 2,560,477 | Roethel | July 10, 1951 |